(12) United States Patent
Stern et al.

(10) Patent No.: US 11,605,247 B2
(45) Date of Patent: Mar. 14, 2023

(54) GENERATING PEOPLE COUNTS BASED ON DISPENSER USAGE

(71) Applicant: GPCP IP Holdings LLC, Atlanta, GA (US)

(72) Inventors: Dani Itzhak Stern, Atlanta, GA (US); Bradley Lewis Wile, Atlanta, GA (US); Erik Allen Cordsen, Suwanee, GA (US); Shekha Saxena, Suwanee, GA (US)

(73) Assignee: GPCP IP Holdings LLC, Atlanta, GA (US)

( * ) Notice: Subject to any disclaimer, the term of this patent is extended or adjusted under 35 U.S.C. 154(b) by 157 days.

(21) Appl. No.: 17/099,280

(22) Filed: Nov. 16, 2020

(65) Prior Publication Data

US 2021/0150825 A1 May 20, 2021

Related U.S. Application Data

(60) Provisional application No. 62/936,542, filed on Nov. 17, 2019.

(51) Int. Cl.
| | |
|---|---|
| *G07C 1/10* | (2006.01) |
| *G07C 9/00* | (2020.01) |
| *G06N 20/00* | (2019.01) |
| *G06Q 10/00* | (2012.01) |
| *G06Q 10/08* | (2012.01) |
| *G06Q 10/20* | (2023.01) |
| *G06Q 10/087* | (2023.01) |

(52) U.S. Cl.
CPC ............... *G07C 1/10* (2013.01); *G06N 20/00* (2019.01); *G07C 9/00* (2013.01); *G06Q 10/087* (2013.01); *G06Q 10/20* (2013.01)

(58) Field of Classification Search
CPC . G07C 1/10; G07C 9/00; G06N 20/00; G06Q 10/087; G06Q 10/20
See application file for complete search history.

(56) References Cited

U.S. PATENT DOCUMENTS

| | | |
|---|---|---|
| 5,852,946 A | 12/1998 | Cowger |
| 5,882,743 A | 3/1999 | McConnell |
| 6,695,246 B1 | 2/2004 | Ellio |
| 9,645,561 B2 | 5/2017 | Borke |
| 10,130,221 B2 * | 11/2018 | Borke ................ A47K 10/36 |
| 10,791,886 B2 | 10/2020 | Borke |

FOREIGN PATENT DOCUMENTS

| | | | |
|---|---|---|---|
| WO | WO-2005065509 A1 * | 7/2005 | ............ A47K 10/36 |
| WO | 2008042382 A2 | 4/2008 | |
| WO | 2015086055 A1 | 6/2015 | |

* cited by examiner

*Primary Examiner* — Kristy A Haupt

(57) ABSTRACT

Disclosed are systems and methods for generating people counts based upon usage data obtained from a dispenser, or an automated dispenser system, of a consumable product. Examples of the disclosure are also directed detecting underutilization or overutilization of a washroom based upon the usage data.

20 Claims, 3 Drawing Sheets

GENERATING PEOPLE COUNTS BASED ON DISPENSER USAGE

CROSS-REFERENCE TO RELATED APPLICATIONS

This application claims the benefit of U.S. Provisional Application No. 62/936,542, filed Nov. 17, 2019 and entitled "SYSTEMS AND METHODS FOR MONITORING WASHROOM APPLIANCES AND PRODUCT DISPENSERS," the contents of which are incorporated by reference herein in its entirety.

BACKGROUND

Automated dispensers are utilized in various environments to facilitate and optimize dispensing of consumable products, such as paper towels, gels, liquids, gases, aerosols, foams, and other consumables. In a facility, such as an office building, airport, stadium, consumable products require maintenance and replenishment from time to time. Facilities management, as a best practice, generally attempts to replenish consumable products in a fleet of dispensers in a manner that minimizes waste but without degrading the user experience so that users do not have to experience an empty dispenser.

Additionally, facilities management might wish to understand traffic count information for washrooms in a facility. For example, it can be useful to know how many visited the various washrooms in a facility to help plan how often the washrooms should be serviced by facilities staff. For example, the more people that visit a particular washroom, the more often the washroom should be visited by staff for cleaning and replenishment of consumable items used in the washroom, such as paper towels, soaps, sanitizer, toilet paper, and other consumable items. However, installing people counting devices in every washroom in a facility can be expensive and also create an addition device that requires installation and maintenance by facilities personnel.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
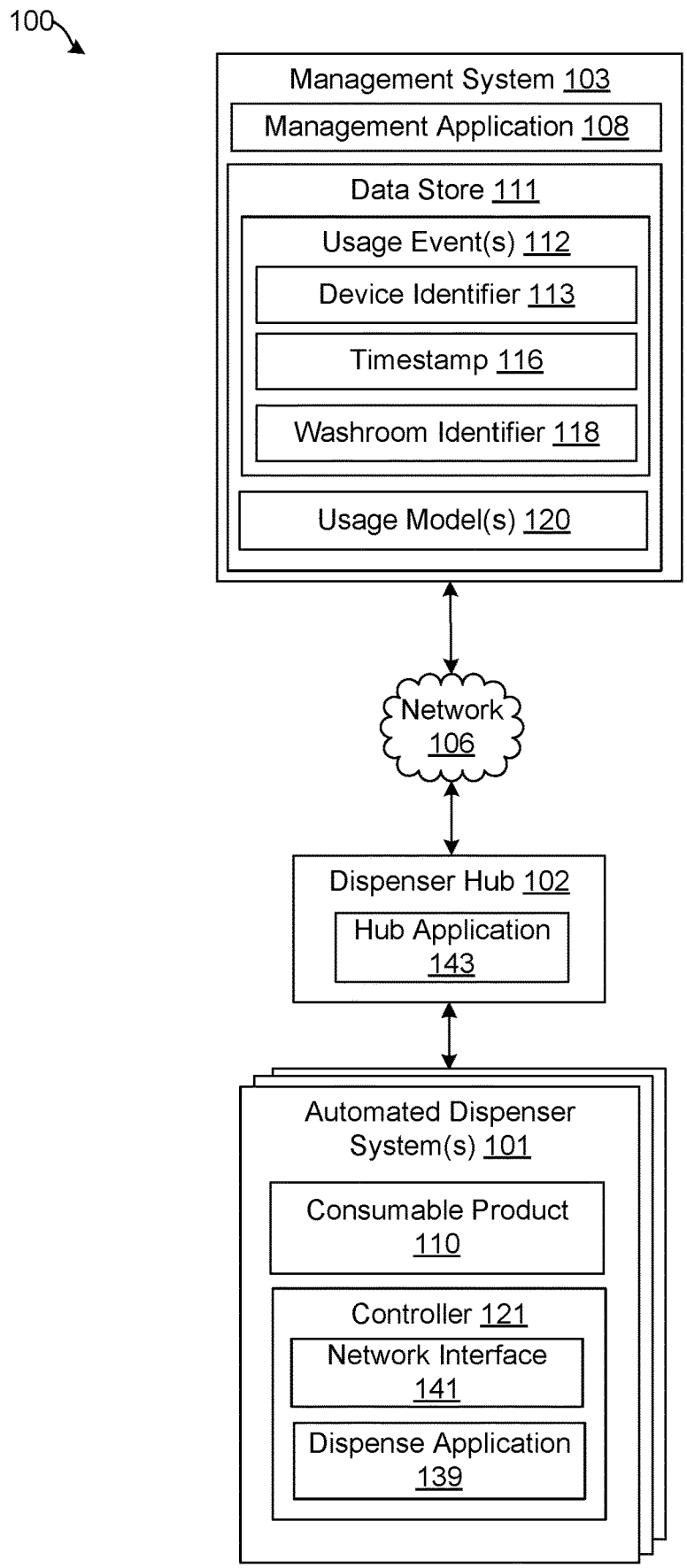
FIG. 1 is a drawing of an example environment according to examples of the disclosure.

The present disclosure relates to systems and methods for monitoring washrooms and devices that are installed in washrooms for usage data. The usage data can be used to determine how many visitors to a washroom there are in a time period and make decisions regarding maintenance and replenishment of consumable products that are in the washroom for use by visitors. Examples of the disclosure are also directed to systems and methods that can generate counts of how many people visit a washroom during a time period based upon usage data obtained from dispenser systems and other devices that are in the washroom. Examples of the disclosure are also directed to systems and methods that can identify variations from expected utilization in a washroom. Variations can take the form of underutilization or overutilization of the washroom from an expected utilization. When a variation is detected, service alerts can be generated.

Automated or manual dispensers or dispenser systems can be used in various settings to dispense consumable products such as sheet product, paper towels, or tissues. The term "sheet product" is inclusive of natural and/or synthetic cloth or paper sheets. Further, sheet products can include both woven and non-woven articles. Examples of sheet products include, but are not limited to, wipes, napkins, tissues, and towels. Dispensers can also be utilized to dispense liquids, aerosols, or gels in various environments.

Dispensers can be deployed in various environments, such as washrooms, lobbies, offices, or other environments. Dispensers can be deployed in various types of facilities, such as office buildings, transportation terminals, public facilities, and the like. In various environments, a fleet of multiple dispensers across different areas of a building can be used. Dispensers can house and dispense, either manually or automatically, different types of consumable products. Facilities personnel are typically tasked with the maintenance and replenishment of consumable product in the various dispensers in a facility.

Aspects of the appliances and automated dispenser systems, as well as associated hardware and software, are discussed in the following patent applications, the disclosures of which are incorporated by reference herein in their entireties: U.S. Pat. No. 9,830,764, filed on Apr. 8, 2015, and entitled "UNIVERSAL DISPENSER INTERFACE;" U.S. Patent Pub. No. 2018/0114395, filed on Dec. 21, 2017, and entitled "UNIVERSAL DISPENSER INTERFACE;" U.S. Patent Pub. No. 2018/0368628, filed on Jun. 22, 2018, and entitled "SHEET PRODUCT DISPENSER WITH PRODUCT LEVEL INDICATOR CALIBRATION;" U.S. Pat. No. 10,342,395, filed on Aug. 25, 2016, and entitled "SHEET PRODUCT DISPENSER WITH PRODUCT LEVEL GAUGE SYSTEM;" U.S. Patent Pub. No. 2019/0063980, filed on Aug. 28, 2018, and entitled "PRODUCT LEVEL DETECTION APPARATUSES AND SYSTEMS FOR FLUID DISPENSERS;" U.S. Provisional Patent App. No. 62/912,751, filed on Oct. 9, 2019, and entitled "SYSTEMS AND METHODS FOR INVENTORY TRACKING OF SHEET PRODUCT ROLLS;" U.S. Provisional Patent App. No. 62/927,995, filed on Oct. 30, 2019, and entitled "SYSTEMS AND METHODS FOR AUTOMATED TRACKING AND REORDERING OF WASHROOM CONSUMABLES."

Referring next to FIG. 1, shown is an example environment 100 in which an automated dispenser system 101 can be deployed. The environment 100 can include one or more automated dispenser system 101, one or more dispenser hub 102, a management system 103, and potentially other devices that are connected to a network 106. The automated dispenser system 101 shown in FIG. 1 can represent a population of many automated dispenser systems 101 that are deployed in a facility. The automated dispenser system 101 can communicate with a dispenser hub 102 that is installed at the facility and that has a network interface to communicate with the network 106.

The dispenser hub 102 can communicate with the management system 103 on behalf of one or more automated dispenser system 101 that are managed by the management system 103. In some implementations, the dispenser hub 102 can carry out or communicate management commands to an automated dispenser system 101 on behalf of a management system 103 because an automated dispenser system 101 may not be equipped with a network interface to communicate directly with the management system 103 over the network 106. In some examples, the dispenser hub 102 can be an internet-of-things (IoT) gateway and the automated dispenser system 101 can be an IoT edge device that is managed by the management system 103. The dispenser hub 102 can operate as a gateway device that can communicate with the automated dispenser system 101 on behalf of the management system 103.

In some implementations, the management system 103 can be located at a facility in which the automated dispenser system 101 is installed and communicate with another management system 103 that is remotely located from the facility. In this configuration, a locally installed management system 103 can act as a local management agent on behalf of a management system 103 that is remote from the facility.

The network 106 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some examples, the management system can be part of a local network and be positioned on the same local network as the automated dispenser system 101. In other examples, the management system 103 can be remote from the automated dispenser system 101. The management system 103 can also include or be operated as one or more virtualized computer instances. For purposes of convenience, the management system 103 is referred to herein in the singular. Even though the management system 103 is referred to in the singular, a plurality of management systems 103 can be employed in various arrangements.

The components executed on the management system 103 can include a management application 108 as well as other applications, services, processes, systems, engines, or functionality not discussed in detail herein. The management application 108 can represent an application or service that can remotely manage one or more automated dispenser systems 101, dispenser hub 102, and obtain information about usage of automated dispenser systems 101 and other appliances and sensors in a facility. The management application 108 can generate and/or update models that represent predicted usage of a washroom or portions of a washroom. The management application 108 can also generate people counts that describe how many people visit one or more washrooms during a period of time. The people counts can be generated based on the usage events received from automated dispenser systems 101 and/or other appliances installed in or near the washrooms.

In some examples, the management application 108 can generate service alerts based on the people counts or on observed utilization of washrooms. For example, if utilization of a washroom is below or above an expected utilization, the management application 108 can determine that a staff member should visit the washroom to determine whether cleaning or servicing of one or more appliances in the washroom is needed.

The data store 111 can include any storage device or medium that can contain, store, or maintain the data for use by or in connection with the management application 108. The data store 111 can be a hard drive or disk of a host, server computer, or any other system providing storage capability. While referred to in the singular, the data store 111 can include a plurality of storage devices that are arranged in one or more hosts, server banks, computer banks, or other arrangements. The data store 111 can include any one of many physical media, such as magnetic, optical, or semiconductor media. More specific examples include solid-state drives or flash memory.

The data stored in the data store 111 can include a usage event 112 and potentially other data that can facilitate management of an automated dispenser system 101. The data store 111 can also store more general usage data that corresponds to usage of one or more automated dispenser system 101 managed by the management system 103. A usage event 112 is an event that corresponds to usage of an automated dispenser system 101 or appliance installed in a washroom environment. For example, a usage event 112 can correspond to a dispensing of a portion of a paper towel from a roll of sheet product that is installed in an automated dispenser system 101. A usage event 112 can also correspond to activation of a sink faucet or the flush of a toilet. A usage event 112 can also correspond to an event triggered by a motion sensor or person detector installed in the washroom.

A usage event 112 can be associated with a device identifier 113 and a timestamp 116. A device identifier 113 can uniquely identify an automated dispenser system 101 or other device installed in the washroom environment. The timestamp 116 can identify a time at which the usage event 112 was either generated or received by the management application 108. The timestamp 116 can also identify both when the event was generated and when it was received by the management application 108. In some implementations, the usage event 112 can also include a washroom identifier 118, which uniquely identifies a washroom in which the device corresponding to the usage event 112 is installed. In other implementations, the usage event 112 might not include a washroom identifier 118 because the management application 108 can identify a washroom by cross-referencing another table or data structure in the data store 111 that associates automated dispenser system 101 with washrooms in a facility.

The data store 111 can also store identifying information about automated dispenser system 101 and other devices that can report usage event 112 to the management application 108. The data store 111 can identify a washroom in which an automated dispenser system 101 is installed, a facility in which the washroom exists, and other identifying information about an automated dispenser system 101. The data store 111 can also store information about the layout of washrooms in a facility, such as the number of stalls, urinals, sinks, faucets, and other fixtures or appliances in the washroom.

Additionally, the data store 111 can store a usage model 120 for one or more washrooms in which devices that are managed by the management application 108 are installed. A usage model 120 can represent an expected usage of one or more appliances, stalls, urinals, sinks, or any fixture or appliance installed in a washroom. The usage model 120 can also include an expected usage of the washroom.

The usage model 120 for a washroom or a portion of a washroom can be generated by a machine learning process that can analyze historical usage data for a washroom and generate a predicted usage for a time of day, day of week, or seasonal usage. The usage model 120 can also be updated by the management application 108 over time based upon ongoing usage of the washroom that is detected by the management application 108 based upon usage event 112 that are collected from an automated dispenser system 101 and other appliances installed in a washroom. For example, if usage of a washroom or portion of a washroom varies from a predicted usage according to a usage model 120, the management application 108 can update the usage model 120 by considering the degree to which usage varied from the usage model 120.

An automated dispenser system 101 can represent a sheet product dispenser that can dispense a consumable product 110, such as sheet product, paper towels or tissues. An automated dispenser system 101 can also represent a device that dispenses liquids, gels, aerosols, or other types of consumable products 110. The automated dispenser system 101 can include a product level sensor that can detect product levels of a consumable product 110. A product level sensor can comprise one or more sensors that can detect how much of a consumable product 110 remains in the dispenser. The product level sensor can be an optical, mechanical, electrical, or electromechanical sensor that detects how much sheet product remains in the dispenser as an approximate percentage of an unused roll of sheet product. As another example, a product level sensor can detect how much of a liquid or gel remains relative to a full tank or bladder of the liquid or gel.

The automated dispenser system 101 can also include a mechanism that dispenses the consumable product 110 to a user. The dispensing of the consumable product 110 can occur based on detection of motion or proximity to the automated dispenser system 101. For example, the mechanism can include a drive roller that can dispense a portion of sheet product on a roll installed in the automated dispenser system 101 to the user. The sheet product can be installed onto one or more roll holders from which a free end of the sheet product can be extracted through a feed mechanism so that the portion is presented to the user.

The automated dispenser system 101 can include a user sensor that can detect the presence of a user so that the consumable product can be dispensed to the user. The user sensor can comprise one or more proximity sensors that can detect proximity of an object to the user sensor. A user sensor can also comprise one or more motion sensors that can detect motion. The user sensor can generate a proximity signal or motion signal in response to detection of an object within a threshold distance of the user sensor and/or motion near the automated dispenser system 101. In practice, proximity of an object within a threshold distance of the user sensor can be a user's hand, arm, or another body part, which can indicate, in certain operation modes, that a portion of an automated dispenser system 101 should be dispensed from the automated dispenser system 101.

The automated dispenser system 101 can also include a controller 121 that can execute a dispense application 139. The controller 121 can represent a processor-based instruction execution system or computing device that can be equipped with memory, input/output interfaces, a network interface 141, a data store, and potentially other computing resources. The controller 121 can be a general purpose computing device or subsystem of the automated dispenser system 101 or a special purpose computing device that is integrated into the automated dispenser system 101. In some implementations, the controller 121 can be in an external housing or located remotely from the automated dispenser system 101. The network interface 141 represents a network capability of the controller 121 that allows the controller 121 to communicate with the management system 103 via the network 106.

In the implementation shown in FIG. 1, the network interface 141 allows the automated dispenser system 101 to communicate with a dispenser hub 102 that is installed in the facility in which the automated dispenser system 101 is installed. In some implementations of the disclosure, an automated dispenser system 101 is not equipped with a wide area network capability. Instead, to reduce cost or complexity, the automated dispenser system 101 can be equipped with a network interface 141 that only enables local communication with a dispenser hub 102, which can collect data from the automated dispenser system 101 regarding consumable product 110 consumption.

The dispense application 139 can comprise software or firmware that directs operation of the automated dispenser system 101. The dispense application 139 can obtain data from a user sensor and determine whether and when to dispense consumable product 110 to the user. For example, when the user sensor detects motion or proximity to the automated dispenser system 101, the dispense application 139 can cause a portion of a paper towel from a product source installed in the automated dispenser system 101 to be dispensed to the user.

The dispense application 139 can also cause a usage event 112 to be sent to the management application 108 each time an amount of consumable product 110 is dispensed to a user. As noted above, a usage event 112 can include a timestamp that is generated when the amount of consumable product 110 is dispensed by the automated dispenser system 101.

The dispenser hub 102 can represent a general purpose or special purpose computing device that can be installed within or near a facility in which one or more automated dispenser system 101 is installed. The dispenser hub 102 can represent a gateway device in an internet-of-things (IoT) deployment, while various automated dispenser systems 101 are installed in a facility as edge devices that are managed by the management system 103. The dispenser hub 102 can be installed at the facility to carry out communications, management, and other tasks on a deployment of automated dispenser systems 101 on behalf of the management system 103. The dispenser hub 102 can operate as a gateway to the network 106 or the management system 103 so that the management system 103 can manage a fleet of automated dispenser systems 101 that may not have the capability to communicate directly with the management system 103.

The hub application 143 can represent an application executed by a processor of the dispenser hub 102. The hub application 143 can facilitate management of an automated dispenser system 101 by the management system 103 and allow for a fleet of management systems 103 to be managed by a remotely executed management application 108. The hub application 143 can be executed on a dispenser hub 102 that is local to the automated dispenser system 101, such as within or near the same facility.

In some examples, usage events 112 generated by the automated dispenser system 101 in response to dispensing consumable product 110 can be first sent to the dispenser hub 102, which can forward the usage event 112 to the management application 108. In other examples, the automated dispenser systems 101 in a facility can report usage events 112 directly to the management application 108.

Figure 2:
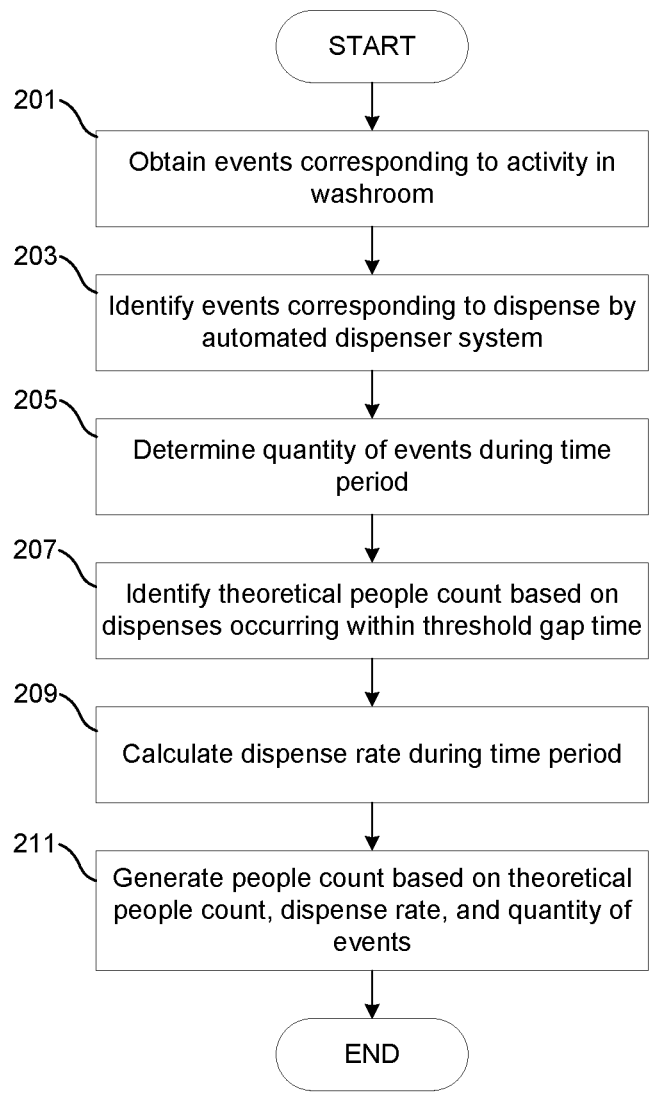
FIG. 2 is a flowchart depicting a method according to examples of the disclosure.

Reference is now made to FIG. 2, which illustrates flowchart 200. The flowchart 200 of FIG. 2 is meant to depict a process or a method according to the disclosure. The method can be carried out by the management application 108 according to various examples. The method illustrated by FIG. 2 shows how the management application 108 can generate a people count based upon usage events 112 received from a washroom. The usage events 112 can be received from the automated dispenser systems 101 that are deployed in a facility in one or more washrooms. The automated dispenser systems 101 can be managed by the management application 108. In this sense, management of the automated dispenser systems 101 can mean that the management application 108 can oversee the operation of the automated dispenser systems 101 by receiving usage data and providing a management portal to facilities staff that allows them to view the status of the automated dispenser systems 101 managed by the management application 108.

Typically, simply counting the number of times a particular dispenser or appliance is activated in a washroom overlooks how people generally interact with dispensers and appliances (e.g., multiple flushes or multiple dispenses), and often leads to over-counting the actual number of people that have used the washroom. According to examples of the disclosure, a model is utilized that adjusts for typical human behavior in washrooms. The model adjusts for typical usage of dispensers in a washroom to generate an accurate people count.

For example, two immediately consecutive dispenses of paper towels may indicate that a single person used the washroom even though the dispenser dispensed two paper towels. Accordingly, the model can evaluate the number of dispenses by the automated dispenser systems 101, the elapsed time between dispenses, and a dispense rate that can be calculated to generate the people count. For example, if two minutes have passed between a paper towel dispenser being activated, it is likely that two separate people used the washroom and further two separate people activated the paper towel dispenser. However, if only one second passes between dispenses at a single dispenser, it is likely that the dispenses were made by a single person. A similar conclusion or correction can be made by similar usage patterns of other appliances or devices in the washroom, such as toilets and sinks.

In various examples, the people counting functionality allows for the system to analyze the traffic in the restroom, log how many people have used the washroom, and potentially alert staff when a certain number of people have used the restroom so that the washroom may be serviced.

Therefore, the model implemented by the management application 108 can be a mathematical model that is generated using a linear regression analysis that is performed on an observation of usage of automated dispenser systems 101 in washrooms and an actual people count. The model that is generated can be utilized to calculate accurate people counts based upon usage event 112 according to aspects of the disclosure.

Accordingly, at step 201, the management application 108 can obtain usage events 112 that correspond to activity in a washroom. In one example, the management application 108 can obtain from the data store 111 those events for a washroom in a facility during a certain time period. For example, the management application 108 can obtain usage events 112 corresponding to an hour or any other time window. The usage events 112 can correspond to dispensing of consumable product 110 to users in the washroom. The usage events 112 can also correspond to other activity, such as activation of toilets, sinks, motion sensors, or other sensors or appliances that are installed in or around the washroom.

As noted above, a usage event 112 can be associated with a device identifier 113, a timestamp 116, and a washroom identifier 118. The device identifier 113 can uniquely identify the device to which the usage event 112 corresponds. The timestamp 116 can be generated by an automated dispenser system 101 and can be generated when the usage occurred. For example, when the automated dispenser system 101 dispenses a portion of consumable product 110, the timestamp can mark when the dispensing occurred. The washroom identifier 118 can identify a washroom to which the usage event 112 corresponds. The washroom identifier 118 can be included in the usage event 112 provided by the automated dispenser system 101 to the management application 108. In some implementations, the management application 108 can determine the washroom identifier 118 before saving the usage event 112 to the data store 111 by cross-referencing another table or data structure in the data store 111 that links automated dispenser systems 101 that are managed by the management application 108.

At step 203, the management application 108 can identify events during the time period that correspond to dispenses of consumable product 110 by automated dispenser systems 101 in a washroom. In a process according to FIG. 2, the management application 108 can generate a people count that corresponds to people who used the washroom during the time period based upon an analysis of the dispenses by automated dispenser systems 101 in the washroom. However, a similar analysis can be performed based upon other types of usage events 112 in a washroom, such as faucet activations or toilet flushes. The analysis can be performed on the usage event 112 for each automated dispenser system 101 to generate a people count that is associated with usage of the automated dispenser system 101. The people count that is associated with the usage of the automated dispenser system 101 can be summed with the people count associated with other automated dispenser systems 101 in the washroom to arrive at a total people count during the time period.

At step 205, the management application 108 can determine a quantity of usage events 112 during the time period for an automated dispenser system 101. To determine the quantity of usage events 112, the management application 108 can count the number of usage events 112 with a timestamp that falls within the time period for which the people count is being generated.

At step 207, the management application 108 can identify a theoretical people count based on a quantity dispenses occurring within the time period. In step 207, the management application 108 can filter the usage events 112 by generating an adjusted quantity of dispenses during the time period. The management application 108 can remove usage events 112 that occur within a threshold time gap of a previous usage event 112. The threshold time gap can be ten seconds, for example. The management application 108 can assume that a dispense that occurs within ten seconds of a predecessor dispense has a chance of corresponding to a single person in the washroom. For example, if three dispenses occur during an hour, but the last dispense occurs within three seconds of its predecessor, the management application 108 can determine that the theoretical people count is two during the time period.

At step 209, the management application 108 can calculate a dispense rate for the automated dispenser system 101 during the time period. Specifically, the management application 108 can calculate a mean dispense rate during the time period. The dispense rate can be calculated as the inverse of the gap between consecutive dispenses. The mean dispense rate can be calculate as the mean or average of the observed dispense rates during the time period. For example, if there are five, ten, and fourteen seconds between three dispenses observed in a time period, the mean dispense rate is (⅕+ 1/10+ 1/14)/3, or approximately 0.1238.

At step 211, the management application 108 can calculate the people count based upon the quantity of usage events 112 during the time period, the theoretical people count during the time period, and the mean dispense rate during the time period. The model utilized by the management application 108 can be as follows:

$$q*0.4391+t*0.5023+m*0.3478 \quad \text{Equation 1}$$

In Equation 1, q represents the quantity of usage events 112, or the quantity of dispenses during the time period, t represents the theoretical people count, or the number of times a dispense event follows a predecessor event by more than the threshold time gap, and m represents the mean dispense rate observed during the time period. The management application 108 can calculate the people count by calculating a result of Equation 1. The management application 108 can calculate a total people count for a washroom during a time period by calculating a people count corresponding to all the automated dispenser systems 101 in a washroom and summing the respective people counts together.

The model multiples the quantity of events, the quantity of dispenses occurring outside of the threshold gap time, and the mean dispense rate by respective constants defined by the model that calculates the people count. The respective constants are shown above in Equation 1. Thereafter, the process proceeds to completion.

The management application 108 can calculate a total people count for a washroom by running the model on all of the usage events 112 received in a time period for all of the automated dispenser systems 101 in the washroom. The model can be run individually on each automated dispenser system 101 and summed to arrive at a total people count. The usage events 112 for any time period can be analyzed to generate a people count for that time period.

Figure 3:
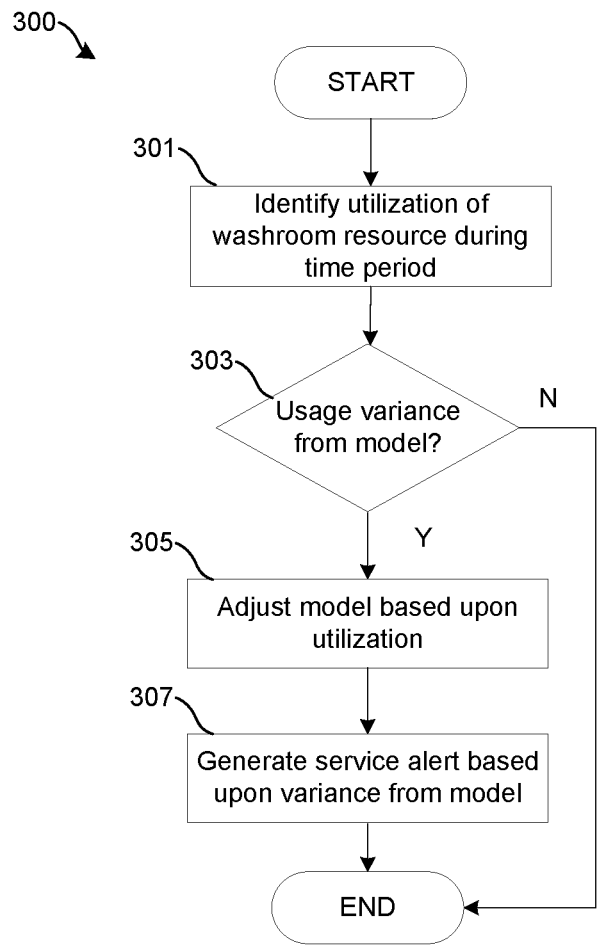
FIG. 3 is a flowchart depicting a method according to examples of the disclosure.

Reference is now made to FIG. 3, which illustrates a flowchart 300. The flowchart 300 of FIG. 3 is meant to depict a process or a method according to the disclosure. The method can be carried out by the management application 108 according to various examples. The method illustrated by FIG. 3 shows how the management application 108 can detect underutilization of a washroom according to various examples of the disclosure.

According to various aspects of the present disclosure, appliance and dispenser underutilization generally relates to monitoring and tracking usage of resources in a washroom, such as automated dispenser systems 101, and generating service alerts when a variation from expected usage occurs. For example, an out-of-service or faulty stall, automated dispenser system 101, toilet, faucet, or sink might occur that affects utilization of a washroom. When a variation in usage of the washroom occurs, a servicing of the washroom can return usage to a more expected level.

In various examples, the system uses a machine learning model to build and record expected use levels of different appliances and dispensers throughout different times of the day. The system can also compare the calculated use levels from the model with a run-time model that takes into account a real-time data stream of current use data and adapts the historical expected ranges/use levels to current use data.

First, at step 301, the management application 108 can identify utilization of a washroom resource during a time period that is being analyzed. The time period can correspond to a usage model 120 that predicts usage of the source over various time periods. For example, the usage model 120 might predict usage over a day or week. Accordingly, the time period that is being analyzed can similarly be a day or week. The usage model 120 can also predict usage for certain stalls, sinks, toilets, faucets, dispensers, or other washroom resources within a washroom environment. Accordingly, the management application 108 can attempt to detect usage that varies from usage model 120 predictions regarding these various resources.

The utilization can correspond to a people count that is calculated using the model as shown in FIG. 2. The utilization can also correspond to other usage data obtained with respect to a washroom, such as the number of times a stall is used, a toilet flushed, or a faucet used during the time period.

At step 303, the management application 108 can determine whether the observed usage varies from the usage model 120. The management application 108 can determine whether the usage varies from the usage model 120 by more than a threshold amount. In some examples, the system may analyze each stall individually for changes in detected use, and the system can generate service alerts accordingly. For example, if the originally expected use of a washroom stall according to a usage model 120 is six people for a time period but the detected use was four people, the management application 108 can detect a usage variance from the usage model 120. The degree to which the model is adjusted can be determined using a machine learning engine or model that can automatically adjust the usage model 120 using a machine learning process.

If no variation is detected at step 303, the process can proceed to completion. If a variation is detected at step 303, the process can proceed to step 305, where the management application 108 can adjust the usage model 120 based upon the detected variation. Continuing the above example, if the originally expected use of a washroom stall according to a usage model 120 is six people for a time period but the detected use was four people, the management application 108 can revise the usage model 120 to anticipate five people using the stall during the time period moving forward.

In some examples, the management application 108 can process external or third party data sources that are relevant to the location of a washroom in which the dispensers and appliances are stationed and that might affect predicted usage. For example, for washrooms located in an airport, the management application 108 can receive flight data from external sources (e.g., publicly available flight databases via APIs) to calculate expected inbound and outbound flight traffic and compare the flight traffic to detected washroom utilization. If an expected variation is determined, the management application 108 can adjust a usage model 120 according to the expected variation based upon detecting a large variation expected utilization.

At step 307, the management application 108 can generate a service alert based upon variation from a usage model 120 for the washroom. The service alert can alert facilities staff that the washroom utilization varies from an expected utilization according to the usage model 120. The variation, whether the washroom is overutilized or underutilized, can mean that servicing could be necessary. For example, in the case of underutilization, one or more resources in the washroom might be out of order. A toilet, faucet, or automated dispenser system 101 might not be working, which can result in underutilization of the resource or the washroom in general. Overutilization might mean that replenishment of consumable items or cleaning of the washroom might be needed. Thereafter, the process can proceed to completion.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that measurements, amounts, and other numerical data can be expressed herein in a range format. It is also understood that there are a number of values disclosed herein, and that each value is also herein disclosed as "approximately" that particular value in addition to the value itself. For example, if the value "10" is disclosed, then "approximately 10" is also disclosed. Similarly, when values are expressed as approximations, by use of the antecedent "approximately," it will be understood that the particular value forms a further aspect. For example, if the value "approximately 10" is disclosed, then "10" is also disclosed.

As used herein, the terms "about," "approximately," "at or about," and "substantially equal" can mean that the amount or value in question can be the exact value or a value that provides equivalent results or effects as recited in the claims or taught herein. That is, it is understood that amounts, sizes, measurements, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, measurement, parameter or other quantity or characteristic is "about," "approximate," "at or about," or "substantially equal" whether or not expressly stated to be such. It is understood that where "about," "approximately," "at or about," or "substantially equal" is used before a quantitative value, the parameter also includes the specific quantitative value itself, unless specifically stated otherwise.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system comprising:
   at least one automated dispenser system configured to dispense a consumable product, the at least one automated dispenser system associated with a washroom; and
   an application executable by a processor, the application, when executed by the processor, causing the processor to at least:
      obtain a plurality of events corresponding to dispensing an amount of the consumable product, each of the plurality of events associated with one of the at least one automated dispenser system associated with the washroom, and the plurality of events associated with respective timestamps;
      determine a quantity of events within a time period;
      determine a quantity of dispenses during the time period that occur within a threshold gap time of a previous dispense;
      identify a mean dispense rate during the time period, wherein the mean dispense rate comprises an average of observed dispense rates during the time period and an observed dispense rate comprises an inverse of a time between dispenses by the one of the at least one automated dispenser system; and
      generate a people count for the washroom during the time period based upon the quantity of events, the quantity of dispenses occurring within the threshold gap time, and the mean dispense rate.

2. The system of claim 1, wherein the application further causes the processor to generate the people count by inputting the quantity of events, the quantity of dispenses occurring outside the threshold gap time, and the mean dispense rate into a model that calculates the people count for the time period.

3. The system of claim 2, wherein the application causes the model to multiply the quantity of events, the quantity of dispenses occurring outside the threshold gap time, and the mean dispense rate by respective constants defined by the model that calculates the people count.

4. The system of claim 3, wherein the application causes the model to sum the quantity of events, the quantity of dispenses occurring outside the threshold gap time, and the mean dispense rate after multiplying them by the respective constants.

5. The system of claim 3, wherein the respective constants are calculated by training the model using a linear regression on people count data observed for a washroom environment.

6. The system of claim 3, wherein a first constant from the respective constants for the quantity of events comprises 0.4391, a second constant from the respective constants for the quantity of dispenses occurring outside the threshold gap time comprises 0.5023, and a third constant from the respective constants for the mean dispense rate comprises 0.3478.

7. The system of claim 1, wherein the events from the plurality of events correspond to usage of at least one of a faucet or a toilet in the washroom, the events obtained from a sensor associated with the faucet or the toilet that measures usage.

8. A method comprising:
   obtaining a plurality of events corresponding to dispensing an amount of a consumable product, each of the plurality of events associated with an automated dispenser system associated with a washroom, and the plurality of events associated with respective timestamps;
   determining a quantity of events within a time period;
   determining a quantity of dispenses during the time period that occur within a threshold gap time of a previous dispense;
   identifying a mean dispense rate during the time period, wherein the mean dispense rate comprises an average of observed dispense rates during the time period and the observed dispense rate comprises an inverse of a time between dispenses by the automated dispenser system; and
   generating a people count for the washroom during the time period based upon the quantity of events, the quantity of dispenses occurring within the threshold gap time, and the mean dispense rate.

9. The method of claim 8, further comprising generating the people count by inputting the quantity of events, the quantity of dispenses occurring outside the threshold gap time, and the mean dispense rate into a model that calculates the people count for the time period.

10. The method of claim 9, wherein the model multiples the quantity of events, the quantity of dispenses occurring outside the threshold gap time, and the mean dispense rate by respective constants defined by the model that calculates the people count.

11. The method of claim 10, wherein the model sums the quantity of events, the quantity of dispenses occurring outside the threshold gap time, and the mean dispense rate after multiplying them by the respective constants.

12. The method of claim 10, wherein the respective constants are calculated by training the model using a linear regression on people count data observed for a washroom environment.

13. The method of claim 10, wherein a first constant from the respective constants for the quantity of events comprises 0.4391, a second constant from the respective constants for the quantity of dispenses occurring outside the threshold gap time comprises 0.5023, and a third constant from the respective constants for the mean dispense rate comprises 0.3478.

14. The method of claim 8, wherein the events from the plurality of events correspond to usage of at least one of a faucet or a toilet in the washroom, the events obtained from a sensor associated with the faucet or the toilet that measures usage.

15. A non-transitory computer-readable medium embodying instructions executable by at least one processor, the instructions, when executed, causing the at least one processor to at least:

obtain a plurality of events corresponding to dispensing an amount of a consumable product, each of the plurality of events associated with an automated dispenser system associated with a washroom, and the plurality of events associated with respective timestamps;

determine a quantity of events within a time period;

determine a quantity of dispenses during the time period that occur within a threshold gap time of a previous dispense;

identify a mean dispense rate during the time period, wherein the mean dispense rate comprises an average of observed dispense rates during the time period and the observed dispense rate comprises an inverse of a time between dispenses by the automated dispenser system; and generate a people count for the washroom during the time period based upon the quantity of events, the quantity of dispenses occurring within the threshold gap time, and the mean dispense rate.

16. The non-transitory computer-readable medium of claim 15, wherein the instructions further cause the at least one processor to generate the people count by inputting the quantity of events, the quantity of dispenses occurring outside the threshold gap time, and the mean dispense rate into a model that calculates the people count for the time period.

17. The non-transitory computer-readable medium of claim 16, wherein the instructions cause the model to multiply the quantity of events, the quantity of dispenses occurring outside the threshold gap time, and the mean dispense rate by respective constants defined by the model that calculates the people count.

18. The non-transitory computer-readable medium of claim 17, wherein the instructions cause the model to sum the quantity of events, the quantity of dispenses occurring outside the threshold gap time, and the mean dispense rate after multiplying them by the respective constants.

19. The non-transitory computer-readable medium of claim 17, wherein the respective constants are calculated by training the model using a linear regression on people count data observed for a washroom environment.

20. The non-transitory computer-readable medium of claim 17, wherein a first constant from the respective constants for the quantity of events comprises 0.4391, a second constant from the respective constants for the quantity of dispenses occurring outside the threshold gap time comprises 0.5023, and a third constant from the respective constants for the mean dispense rate comprises 0.3478.

* * * * *